Oct. 4, 1955          H. JENSEN          2,719,470

IMAGE STABILIZING APPARATUS FOR AERIAL CAMERAS

Filed April 15, 1946          6 Sheets-Sheet 1

Inventor
H. Jensen
By M. A. Hayes
Attorney

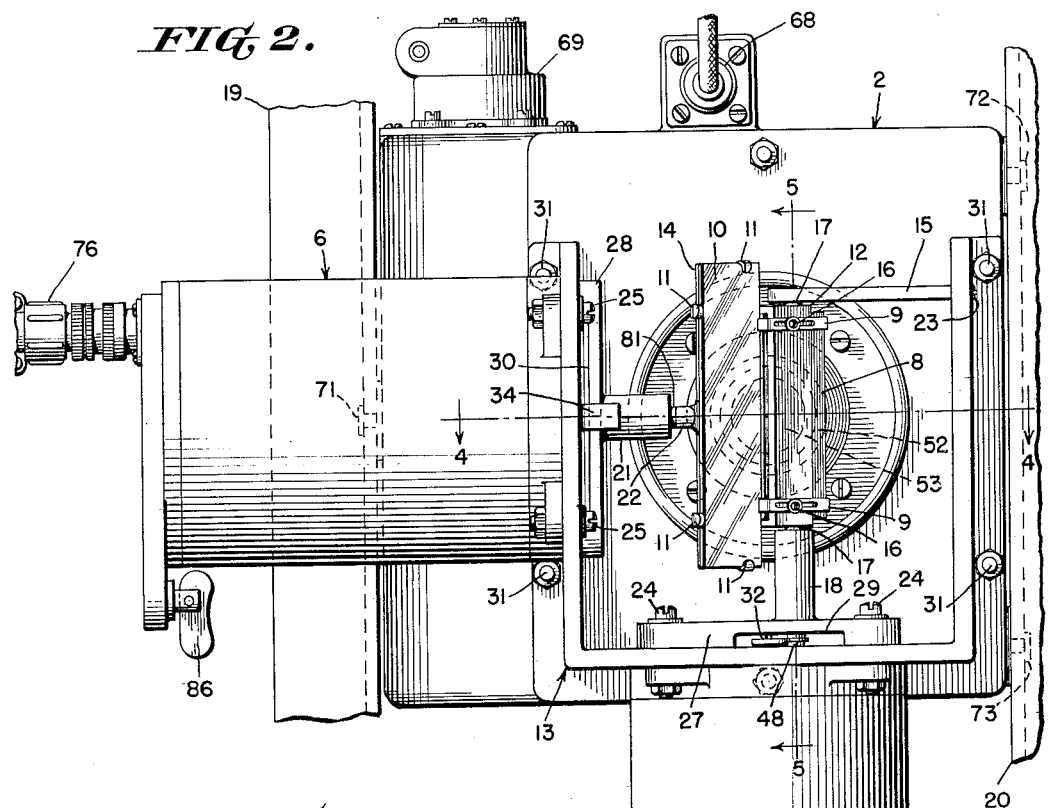
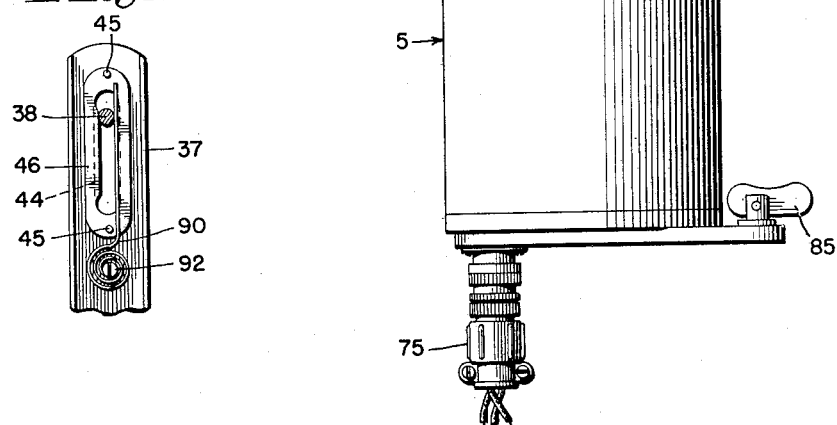

Oct. 4, 1955

H. JENSEN 2,719,470

IMAGE STABILIZING APPARATUS FOR AERIAL CAMERAS

Filed April 15, 1946

Inventor

*H. Jensen*

By *M. O. Hayes*

Attorney

Oct. 4, 1955  H. JENSEN  2,719,470
IMAGE STABILIZING APPARATUS FOR AERIAL CAMERAS
Filed April 15, 1946  6 Sheets-Sheet 4

Inventor
H. Jensen

By
M. O. Hayes
Attorney

Oct. 4, 1955　　　　H. JENSEN　　　　2,719,470
IMAGE STABILIZING APPARATUS FOR AERIAL CAMERAS
Filed April 15, 1946　　　　　　　　　　6 Sheets-Sheet 5

Inventor
H. Jensen

Oct. 4, 1955 H. JENSEN 2,719,470
IMAGE STABILIZING APPARATUS FOR AERIAL CAMERAS
Filed April 15, 1946 6 Sheets-Sheet 6

Inventor
H. Jensen

By M. P. Hayes

Attorney

United States Patent Office 2,719,470
Patented Oct. 4, 1955

2,719,470

IMAGE STABILIZING APPARATUS FOR AERIAL CAMERAS

Homer Jensen, Cincinnati, Ohio

Application April 15, 1946, Serial No. 662,164

14 Claims. (Cl. 95—12.5)

(Granted under Title 35, U. S. Code (1952), sec. 266)

This invention relates to image stabilizing apparatus for airplane photography, and the maintenance of a vertical line of sight between the camera and the earth, or a true line of sight of the camera in any other chosen direction which it is desired to maintain. More specifically, it provides an improved stabilizing system employing a pair of optical devices each stabilized to compensate for angular movement of the aircraft in flight in a different plane or direction.

The invention is well adapted for use in aerial surveying and is suitable for use with the apparatus described in my copending application for a Method of and Apparatus for Magnetic Exploration, Serial No. 680,906, filed July 2, 1946, now Patent No. 2,611,802, issued September 23, 1952.

Whereas the device is especially well adapted for use on aircraft it is of course suitable for use on any other moving body on which the camera would be subjected to random angular movements with respect to the object which it is desired to photograph.

In normal flight, an aircraft usually suffers many disturbing influences which prevent flight in a substantially straight line, due largely to the effects of wind and air currents. If the airplane is attempting to fly a course at right angles to, or athwart a sustained wind, there is a continual drift of the craft in the direction in which the wind is moving. This effect is known as crabbing, and may be compensated for by "pointing" the camera so that the line of motion of the film therein is at a slightly angular position with respect to the longitudinal axis of the aircraft.

The aircraft may also suffer slight irregular angular movements of temporary character in the horizontal plane due to sudden increases or changes in wind velocity. These movements are generally called yawing, and can be corrected for by the same means as for crabbing.

Air currents flowing up or down may cause pitching of the aircraft, that is, angular movement from the line of flight occurring in a vertical plane, in which the longitudinal axes of the aircraft may be tilted.

A further type of angular movement normally encountered in an aircraft attempting to fly a course parallel to the ground is rolling, or the angular movement of the craft about its own longitudinal axis, as when one wing tilts with respect to the other.

All of these movements, if not compensated for, result in undesirable effects upon the photographs taken of the ground from the aircraft, for example, distortion of the image. The subject invention provides novel and improved means for compensating for these random movements of the airplane, particularly the roll and pitch thereof.

Prior art devices attempting to accomplish the aims of the subject invention have not been entirely satisfactory for a number of reasons. Some of the devices have utilized equipment for stabilizing the whole camera, employing large gyroscopes or gyro-servo combinations, thus multiplying the difficulties normally encountered in handling a camera. Other systems have utilized a single mirror or prism, perhaps adapted for universal rotation about a pair of axes. It has been impossible in devices employing a single reflecting surface to avoid some rotation of the image as the reflecting surface is adjusted to compensate for angular movements of the aircraft, resulting in distortion and other undesirable characteristics in the recorded image. Furthermore, the mechanism required for stabilizing one reflecting surface about two axes is quite complicated, and it is extremely difficult, if not impossible, to obtain accurate compensating movements in both planes of adjustment over substantial ranges.

The equipment of the subject invention overcomes the aforementioned disadvantages. By employing two separate optical devices, placed so as to cause minimum angles of reflection and individually stabilized by two stabilizing devices, to compensate for pitch and roll of the aircraft, rotation and distortion of the image is minimized or avoided.

Any suitable stabilizing means may be employed, consisting essentially of a reference element or elements adapted to resist angular movements of the moving body or aircraft in a predetermined plane, or, in other words, to maintain its orientation to the ground or object as the body moves with respect thereto. Associated with this reference element will be a moving system of one or more elements, adapted to move in a predetermined manner with respect to the reference element, as the body moves angularly in a certain plane with respect to the ground or object. These requirements for the stabilizing devices are met satisfactorily by gyroscopes. By using separate gyroscopes individual to the reflectors, it is possible to employ simple operative connections between the reflectors and the gyroscopes, permitting improvements in the precision of compensation for random movements of the aircraft, as well as increasing the rapidity of compensation.

Recent improvements in cameras are taken advantage of in the present invention. For example, cameras are now available which have extremely narrow slits or angles of acceptance, and the subject invention was designed to take advantage of this feature, as will be subsequently more clearly apparent.

A preferred embodiment of the device, employing two mirrors, is especially adapted for use with cameras of the "continuous strip" type, where the angle of acceptance in one plane passing through the focal slit of the cameras is very small. In this embodiment, the two mirrors can be placed so as to cause the various portions of the light path from object to lens to have minimum angles of deviation from each other, and hence to reduce image rotation to a minimum.

The subject apparatus may be employed with cameras having more than one lens, as will be hereafter described, for example, a stereo-camera.

One of the objects of the present invention is to provide new and improved means for stabilizing the field of view of a camera adapted to be mounted on a moving object.

Another object is to provide new and improved stabilizing means to eliminate rotation of the image.

Another object is to provide new and improved means employing a plurality of moveable reflecting surfaces for effecting stabilization of the image.

A further object is to provide an image stabilizing system employing two pairs of mirrors in spaced relation and adapted to be selectively moved to compensate for irregular angular movements of the camera with respect to the object.

Still another object is to provide novel control means for governing the reflecting surfaces of a stabilizing optical system by gyroscopic means.

A further object is to provide a novel method of image stabilization.

Other objects and advantages not specifically set forth hereinbefore will be apparent after a consideration of the following description of the apparatus, taken in conjunction with the accompanying drawings, in which:

Fig. 2 is an enlarged general bottom plan view of the camera, mirrors and mirror frame support, and gyroscopes;

Fig. 11 is a detailed plan view of a portion of the linkwork associated with one of the gyroscopes of Fig. 2;

Figure 1:
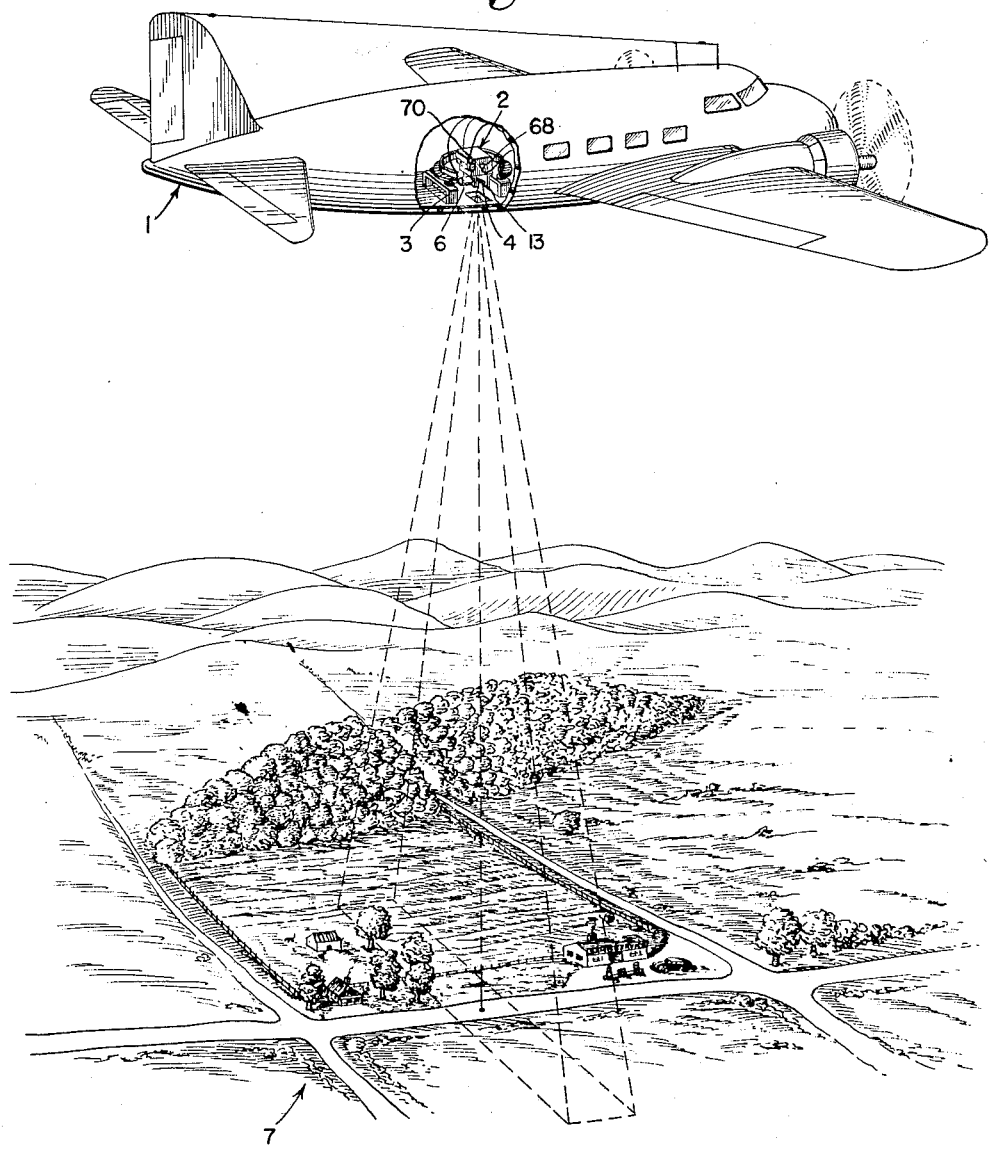
Fig. 1 is a general view of one embodiment of the device showing the camera mounted in an aircraft, and the field of view of the camera with respect to the terrain beneath.

Referring now to the drawings in which like numerals are used throughout to designate like parts, and more particularly to Fig. 1, there is shown an aircraft designated generally by the numeral 1, in flight over a terrain 7 which it is desired to photograph. Mounted inside the aircraft on a main supporting framework generally designated at 3, which permits movement or "pointing" of the camera to compensate for crabbing, as has been heretofore explained, is a camera generally designated at 2.

Any suitable camera may be used, for example, a continuous strip camera known in the trade as a Sonne S-7, manufactured by the Chicago Aerial Survey Company. This camera is characterized by having a very narrow slit or optical opening, resulting in an angle of acceptance which is extremely narrow, which offers many aforementioned advantages, as will be hereafter elaborated.

Beneath the camera supported in the small frame 13 are the optical devices for stabilizing the image as the aircraft moves, the devices being generally designated at 4. Mounted upon the framework are two vertical seeking gyroscopes, of any suitable general commercial type, which control the optical devices to compensate for angular movement of the aircraft, one of the gyroscopes being generally designated at 6.

Referring now to Fig. 2, which shows a general enlarged bottom plan view of a preferred embodiment of the device, there is revealed in greater detail the camera 2. Three studs 71, 72 and 73 are provided for supporting the camera on the crossbars 19 and 20 of the aforementioned main supporting framework 3. A power connection 68 is provided for bringing power to the motor of the camera, the motor providing for movement of the film. Speed control means of any convenient design may be provided within the camera to permit adjusting the speed of the film into correspondence with the speed of the aircraft, a speed control connection being provided at 69, and a portion of the speed control cable being shown at 70, Fig. 3.

The gyroscopes 5 and 6 shown in block outline in Fig. 2 mounted on the framework 13 have power connections 75 and 76 respectively, and caging lever controls 85 and 86 respectively. Any suitable driving means may be employed for the gyroscopes. Whereas any suitable arrangement may be provided, in the subject embodiment each gyroscope has an outer gimbal ring adapted to be maintained by action of the gyroscope in a horizontal plane, with a shaft attached thereto which rotates about its axis as the gyroscope operates to perform its stabilizing function as the aircraft moves angularly in a plane perpendicular to the axis, the gimbal rings and shaft not being shown in Fig. 2.

The aforementioned frame 13 is composed of aluminum or other suitable material and adapted to be attached to the camera 2 as by screws 31 having nuts associated therewith, and the frame having disposed within two optical mirrors 8 and 10, mounted upon supports 12 and 14 respectively, and held in place thereon by clamps 9 and 11 respectively, which are secured to the supports by screws, such as 16. The support 12 may be integral with two end shafts 17, one of which is journalled for rotation in the supporting stanchion 15 and one in the supporting post 18, the latter extending through the post 18 to a lever arm 32 fixed thereto by screw 48 to form an operative connection to the aforementioned gyroscope 5, which is fixed to the frame 13 by any suitable means. The post 18 may be formed integral with a cross support 27 having cut away central portion 29, and which is attached to frame 13 by suitable means, such as screws 24. The gyroscope may be of any suitable make which has properties hereafter to be described. The stanchion 15 is secured by screws 23 to the supporting frame 13. In the operation of the device to stabilize an image as the aircraft moves, the mirror 8 rotates about the axis of shaft 17, as will be more fully explained subsequently.

Somewhat beneath (as viewed in Fig. 2) and partly to one side of mirror 8 is the aforementioned similar mirror 10, the support for which, designated at 14, is adapted to rotate with a shaft 22 having a portion reduced in diameter as will be subsequently seen and which is journalled for rotation in support 21 and extends therethrough to permit an operative connection with the second aforementioned gyroscope 6, said connection including a lever arm 37 not visible in Fig. 2 and which is fixed to shaft 22, and having an extended counterbalance observed at 34. A spacing washer 81 is provided as shown. The post 21 may be formed integral with a cross support 28 having cut away central portion 30 for movement of the lever 37 and counterbalance 34, and which may be attached to the frame 13 by any suitable means, such as screws 26, Fig. 5. The gyroscope 6 may be attached to the frame 13 by any suitable means, such as by screws 25.

Disposed beneath the mirrors (as viewed in Fig. 2) is the camera opening including lens barrel 52 and lens 53.

Whereas the lens axis is shown in Fig. 2 as being normal to the axis of rotation of the mirror 10 and in a plane common to the two axes, the exact position of the lens axis with respect to the axes of rotation of mirrors 8 and 10 is not critical, it being permissible to shift the lens axis over a considerable area with respect to the mirror axes and still maintain proper optical operation of the device.

Figure 3:
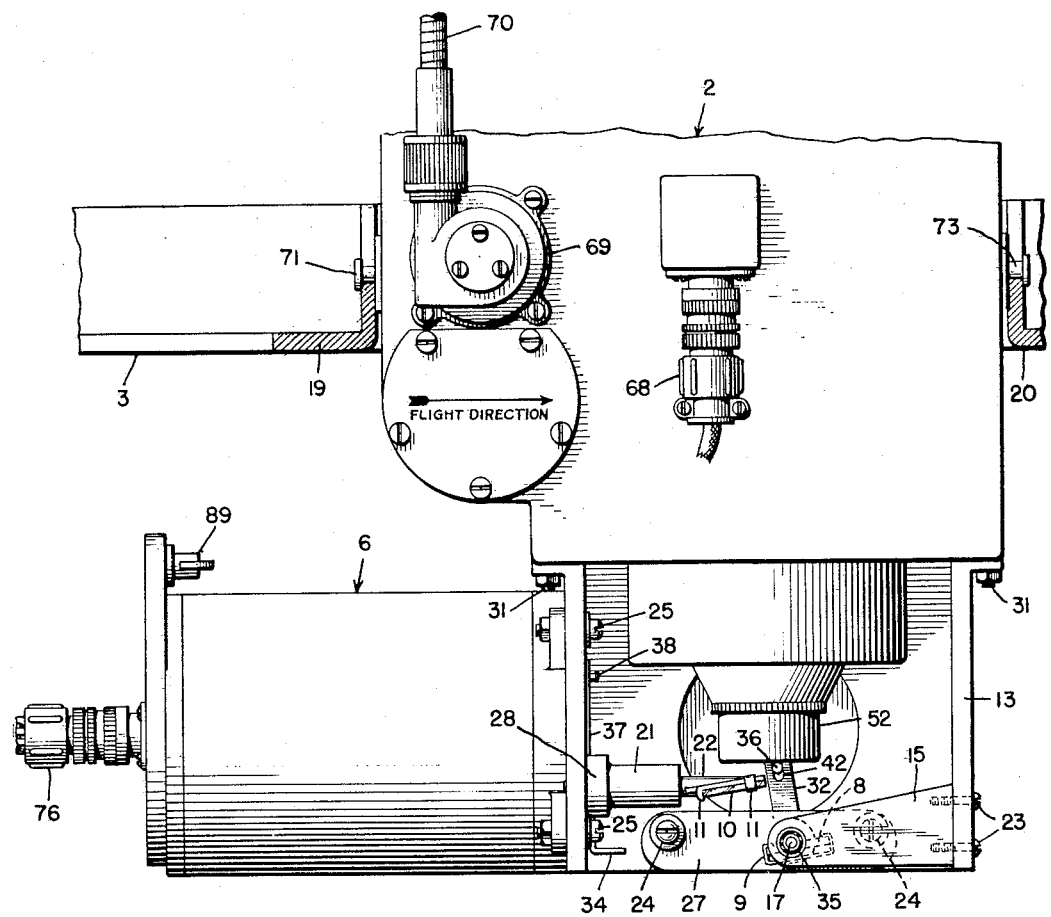
Fig. 3 is an enlarged end elevational view of the apparatus of Fig. 2.

Referring now to Fig. 3, which shows an end elevation of the device of Fig. 2, it is observed that the two mirrors 8 and 10, when in their normal positions, that is, when no compensating adjustment is taking place, each have their faces inclined at an equal small angle as required by the design of the particular embodiment, and in this case 10 degrees, with respect to a plane normal to the line of sight and/or optical axis. This inclined relationship permits light reaching the mirror 10 from the desired image or object, if travelling in a direction parallel to the line of sight of camera 2, after reflection at an angle of 20 degrees (or twice the angle of incidence) by both mirrors 10 and 8, to reach the camera lens in the proper manner, in a path parallel to the lens axis.

In Fig. 3, the relation of the lens barrel 52 to the mirrors is clearly shown, and the operative connections between the two mirror shafts 17 and 22 of mirrors 8 and 10 respectively, and gyroscopes 5 and 6 respectively, are visible, it being understood that the arm 32 is fixed in an aforementioned manner to shaft 17 to turn therewith.

This arm 32 has a longitudinal slot 42 therein for receiving pin 36, which is operatively connected by a crank arm (not visible in Fig. 3) with gyroscope 5, and is moved in a manner to be more fully described subsequently, thereby to rotate the mirror shaft 17 and mirror 8 within narrow limits, to compensate for angular movement of the aircraft with respect to the earth, in a manner to be later elaborated.

There is also revealed the ball bearing 35 for shaft 17, in stanchion 15. Similar bearings may be provided in posts 18 and 21. The lever arm 37 fixed to the shaft 22 of mirror 10, has a longitudinally extending slot, Fig. 5, similar to the slot 42, and which is adapted to engage the pin 38 which is moved by action of gyroscope 6 thereby to rotate mirror 10 to compensate for angular movements of the camera 2 with respect to the desired object, in a manner to be more fully described subsequently.

As stated previously, the gyroscopes 5 and 6 may be of any suitable design, for example vertical seeking gyroscopes having adjustable precessing mechanisms, provided that the desired movements of the pins 36 and 38 which control the degree of rotation of mirrors 8 and 10 respectively, are accomplished. The desired amount of movement is governed by the basic law for reflection from plane mirrors, that is, that the angle of reflection is equal to the angle of incidence. The angle between the light rays reaching the mirror and those leaving the mirror after reflection, will then be twice the angle of incidence.

The required corrective movement, or angular movement of the mirrors about their supporting shafts, will be one half the angular movement of the camera with respect to the desired object, that is, the angular movement of the camera in a plane perpendicular to the axis of rotation of the respective mirror. The pins 36 and 38 provide the desired movements, as will be subsequently more fully apparent.

Figure 4:
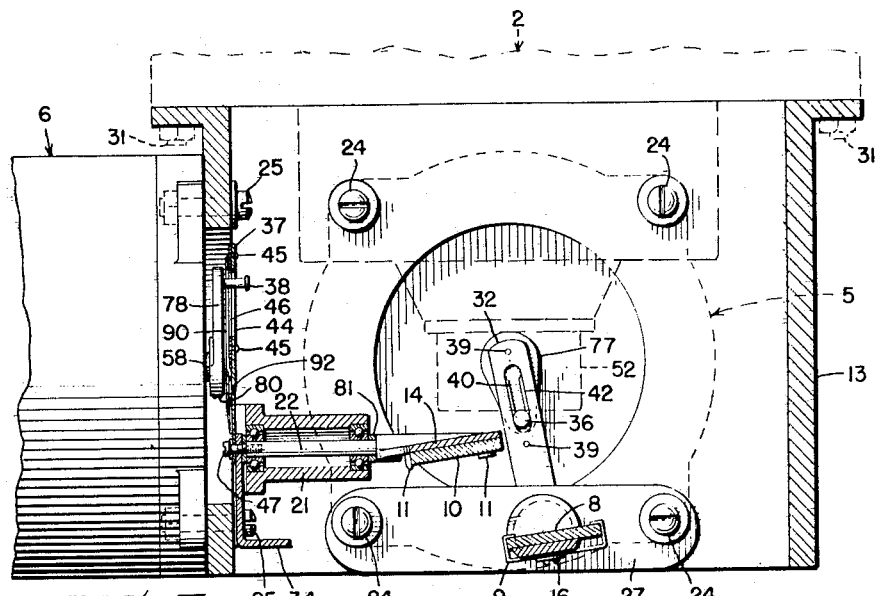
Fig. 4 is a vertical section along the line 4—4 of Fig. 2.
Figure 5:
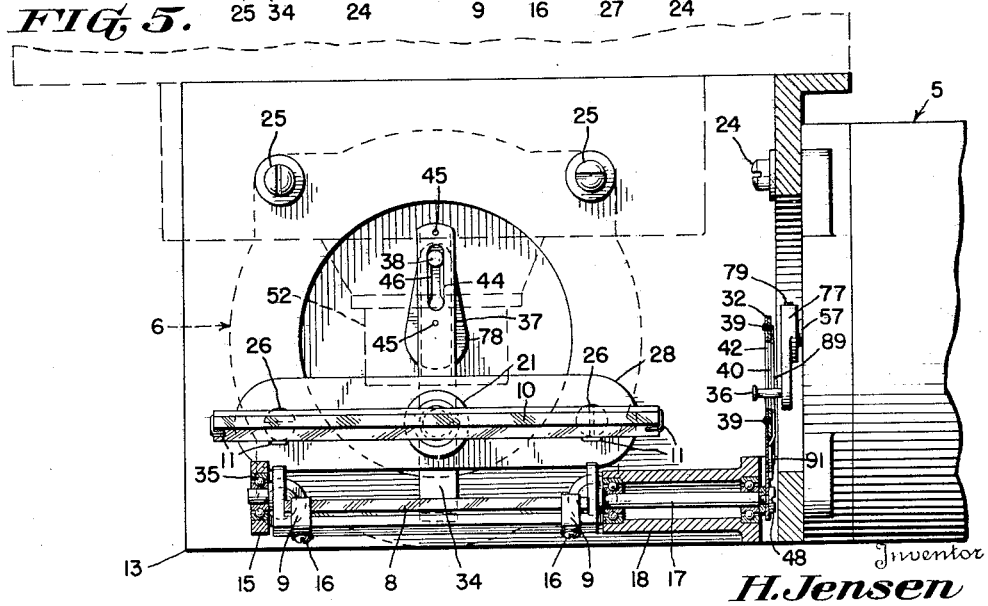
Fig. 5 is a vertical section along the line 5—5 of Fig. 2.

Reference is made now to Figs. 4 and 5, which are vertical sections along the lines 4—4 and 5—5 respectively of Fig. 2, and which show additional details of the structure described above.

In Fig. 4, all portions of the operative connection between mirror shaft 22 and gyroscope 6 are revealed. The arm 37 is seen to be attached to shaft 22 by screw 47. The arm has a slot 44 to receive a pin 38 fixed on a crank 78 secured to the gimbal shaft 58 of gyroscope 6 by set-screw 80. Rotation of the shaft 58 as the gimbal ring moves about its supporting axis, when the gyroscope is acting in response to angular movements of the supporting structure occurring in a plane perpendicular to the axis of shaft 58, causes corresponding rotation of the crank arm, thereby to rotate (in the same direction) the lever arm 37 and mirror 10.

It should be noted, however, that whereas the lever system of crank 78 and arm 37 is such that the mirror face rotates in the same angular direction as the crank shaft, this angular direction of rotation of mirror 10 opposite to the direction of roll of the aircraft. This is because the gyroscope, in resisting angular movement of the supporting body, tends to maintain the gimbal ring in its original plane with respect to the earth, and the crank arm attached to the gimbal shaft always moves angularly with respect to the aircraft in a direction opposite to that in which the aircraft moves angularly with respect to the earth.

Secured to the arm 37 by small rivets 45 or other suitable means is a hard, flat working surface 46 of steel or other suitable material. Fixed upon the arm 37 by a set screw 92 is a spring 90, adapted to bear against the crank pin 38, thereby to reduce the effects of high frequency vibration of the aircraft upon the operation of the stabilizing system.

Fig. 5 shows similar details of the operative connection between mirror shaft 17 of mirror 8, and gyroscope 5. The arm 32 is fixed by screw 48 to rotate with shaft 17, and has a slot 42 therein for receiving pin 36, which is attached to a crank arm 77 which is adapted to rotate with gimbal shaft 57 of gyroscope 5, being fixed thereon by set screw 79. Arm 32 also has a working surface 40, which may be similar to aforedescribed surface 46, attached thereto by rivets 39, and a spring or vibration suppressing means 89 attached thereto by screw 91. It is noted that rotation of shaft 57 due to the action of gyroscope 5 results in rotation of mirror shaft 17 in the opposite direction from the direction of rotation of the arm, because of the particular linkage employed. However, since, as heretofore explained, the crank arm always rotates angularly in a direction with relation to the aircraft which is opposite to the direction of movement of the aircraft with respect to the ground, the net result of the gyroscopic control of mirror 8 is to rotate the mirror in the same direction as the rotation of the aircraft with respect to earth.

The directions of rotation of the two mirrors are thus predetermined; mirror 8 rotates in the same angular direction as the aircraft to correct for pitch, and mirror 10 rotates in an opposite direction from the aircraft's movements to correct for roll.

It is noted that in the arrangement of the subject embodiment, light rays from the object strike mirror 10 first, being reflected from thence to mirror 8 whence they travel to the lens. It will be apparent to those skilled in the art that the optical sequence of these mirrors could be reversed if desired, and an arrangement made in which light rays first reach the pitch-correction mirror. In this case proper operation of the system would require that the relative angular motion of the mirrors be reversed, the pitch-correcting mirror rotating in the opposite direction from the angular movement of the aircraft, and the roll-correcting mirror rotating in the same direction as the angular movement of the aircraft as it rolls.

The term "first mirror" as employed herein is defined as either the mirror nearest the object or the mirror nearest the lens.

Reference is made now to Fig. 11 on which are shown details of the lever arm 37. The spring 90 bears normally against the crank pin 38 for an aforementioned purpose, being fixed to the arm 37 by screw 92. Lever arm 32 may be similar to arm 37 except as to dimensions.

Figure 8:
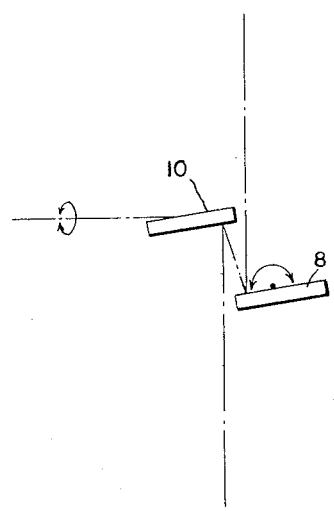

Reference is made now to Fig. 8 which shows a diagrammatic view of the mirrors 8 and 10, and which may be observed in conjunction with Figs. 4 and 5, to obtain a clear understanding of the particular geometrical relationship in the operative connection between the mirror 8 and the gyroscope 5. Preferably the pin 36 is attached to an aforedescribed crank arm 77 adapted to rotate about the gimbal axis of gyroscope 5, but may be attached to the principal gimbal ring of the gyroscope in an off-center position, so long as a suitable dimensional relationship is maintained to provide a 2 to 1 movement. As seen from the view, Fig. 5, the distance between the center line of the pin 36 and the gimbal axis of shaft 57 should be one-half the distance between the center line of the pin 36 and the axis of the shaft 17 which rotates the mirror. Such a system of linkages provides that for small angular movements of the aircraft the mirror 8 will be rotated substantially one-half the angle of rotation of the gimbal ring, the angle of rotation of which will be equal to the angular movement of the aircraft and camera frame with respect to the earth as the plane pitches, the gyroscopic action providing such compensating motion in a manner well known to those skilled in the art to which the invention pertains.

Figure 7:
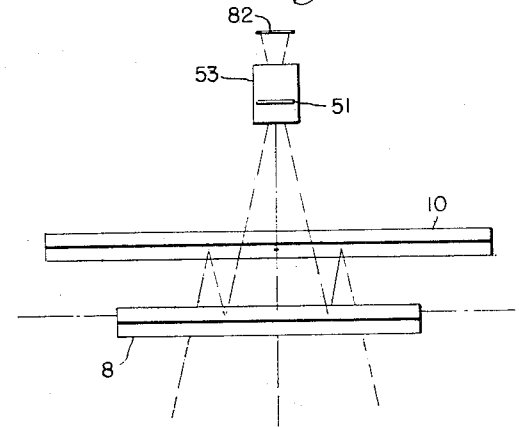

Fig. 7 is a diagrammatic view of the mirrors as seen from the side of the frame, and may be considered in conjunction with Figs. 4 and 5 to ascertain with particular clearness the operation of mirror 10. The pin 38 may be attached to the aforedescribed small crank arm 78 adapted to rotate about the longitudinal gimbal axis of gyroscope 6, the angle of rotation being equal to the amount of angular movement of the camera with respect to the earth, as the plane rolls. The length of the crank or, more precisely, the distance between the center line of pin 38 in the slot 44 and the axis of the gimbal shaft 58 should be one-half the distance between the center line of the pin 38 and the axis of rotation of shaft 22 of mirror 10. Such a system of linkages provides for an angular motion of mirror 10 about its axis substantially equal to one-half the angular movement about its axis of the crank arm 78 to which pin 38 is attached.

It will be apparent that the linkwork hereinbefore described is accurate over only a small angle of operation. At any large angles, the length ratios of 2 to 1 are no longer maintained due to substantial longitudinal movements of the pins in their respective slots, which change the proportions between the length of the arms or levers attached to the mirror shafts, and the length of the levers or crank arms which operatively connect the pins to the gyroscopes. However, the useful angle is ample for most applications of the device, since large roll angles must always result in turning of the airplane, and large pitch angles seldom occur. The angles of roll or pitch for which corrections can be made are twice the aforementioned accurate linkage angles. Operating conditions requiring or causing roll and pitch of the aircraft greater than those which can be corrected for by the subject apparatus would probably render any photographic work impossible or undesirable.

It will be understood by those skilled in the art, that, since in the illustrated embodiment, the pitch correction is made by the mirror which is second in the optical path from object to lens, in order to correct for pitch, the angle of rotation of the mirror 8 should be in the same direction as the angle of movement of the aircraft, while to correct for roll, the angle of rotation of the mirror 10 should be in the opposite direction to the angle of movement of the aircraft. It should be noted that the function of the two mirrors, in another embodiment, could be interchanged, so that the first mirror receiving light from the desired object would correct for pitch, and the second for roll, in which case the relative rotations would be reversed. Suitable arrangements of the linkages similar to the aforedescribed between the mirror shafts and the gyroscopes could readily be made to provide the desired direction of rotation of the mirrors.

Figure 6:
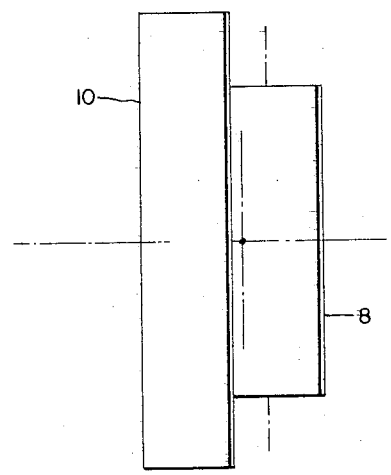
Figs. 6, 7 and 8 are diagrammatic views of the mirrors of Fig. 2, as seen from the top, side, and end, respectively, of the supporting framework.

Reference is made now to Fig. 6, which shows in diagrammatic form the position of the mirror axes with respect to the lens axis or camera line of sight, the mirror axes of rotation being indicated by dashed lines.

Fig. 7, to which reference is now made, is also an optical diagram showing reflections from the two mirrors with respect to the camera lens and/or diaphragm controlling the size of the light aperture. It is again recalled that the two mirrors are adapted to vary the angles at which they reflect the images, in two planes substantially normal to each other, mirror 8 correcting for pitch of the airplane, mirror 10 for roll. If $\alpha$ is made to represent the angular movement of the lens and camera in a given plane of correction, the mirror is caused to rotate by an angle $\alpha/2$ in the same plane. This relationship holds for both mirrors, it being recalled, however, that whereas the angle of rotation of mirror 8 is in the same direction to the angle of pitch, the angle of rotation of mirror 10 is in the opposite direction to the angle of roll. The lens axis is designated at X.

The operation of the embodiment heretofore described and, shown in bottom plan view in Fig. 2 may be summarized as follows, assuming that the line of flight is from left to right as viewed in the figure: Upon pitch of the aircraft, mirror 8 will be rotated about shaft 17 in response to the action of gyroscope 5, in such a direction as to provide compensating reflection and shift of the image, rotating in the same direction as the aircraft's pitch, it being understood that the angular movement of the aircraft as it pitches will occur in a plane substantially perpendicular to the axis of mirror shaft 17. When the aircraft rolls, or one wing lifts or falls with respect to the other wing, mirror 10 is rotated in an appropriate amount about shaft 22 under the control of gyroscope 6, in a direction opposite to the angular movements of the aircraft, movements of the aircraft as it rolls occurring in a plane substantially perpendicular to the axis of shaft 22.

A second embodiment of the invention, in accordance with a previously stated object, is to provide an image stabilizing system employing two pairs of mirrors in spaced relation, one mirror of one pair being adapted to be moved in relation to the other mirror of the pair to effect stabilization of the image in one plane, both the mirrors of the other pair being adapted to be rotated simultaneously about an axis normal to the line of intersection of the planes of the two mirror faces, and angularly disposed with relation to the mirror faces to effect image stabilization in a second plane, thereby to compensate for both roll and pitch of the aircraft or random angular movement of any other vehicle on which the camera is mounted.

Figure 9:
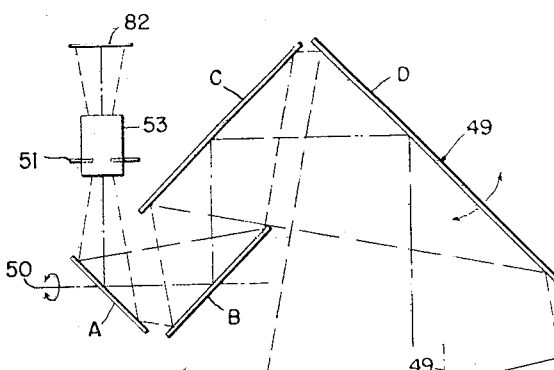
Fig. 9 and 10 are optical diagrams of a system employing four mirrors suitable for use with the present invention, the diagram of Fig. 10 being rotated 90 degrees from the view of Fig. 9.

Fig. 9 is an optical diagram of such a system, and which may be used with the camera and support of Fig. 2 after slight modification, mirrors C and D replacing mirror 10, and mirrors A and B replacing mirror 8 of Fig. 2.

In the operation of the system of Fig. 9, mirror C is fixed, the reflecting surface being disposed at an angle of 45 degrees with respect to the lens axis or line of sight. Mirror D rotates about an axis 49 parallel to the plane of the reflecting surface thereof and normal or transverse to the optical axis. The angle between the faces of mirrors C and D may be varied thereby, mirror D moving to compensate for shifting of the image due to angular movement of the camera in a plane perpendicular to the axis of rotation 49, the compensating movement of mirror D being one-half the angle of the movement of the camera.

The mirrors A and B are disposed in fixed angular relation to each other, being positioned at an angle of 90 degrees as shown, and are adapted to be simultaneously rotated about an axis 50 angularly related to the mirror faces by an angle of 45 degrees. Both mirrors are simultaneously rotated to compensate for movement of the aircraft with respect to the image in the second plane of compensation perpendicular to the axis 50, the angle of rotation of the mirrors A and B about axis 50 being one-half the angular movement between the axis of the lens and the object.

Any suitable linkage, for example, linkage similar to that described in conjunction with Figs. 4 and 5, may be provided for gyroscopically controlling the rotation of the several mirrors about axes 49 and 50, as in a manner similar to that heretofore described.

Figure 10:
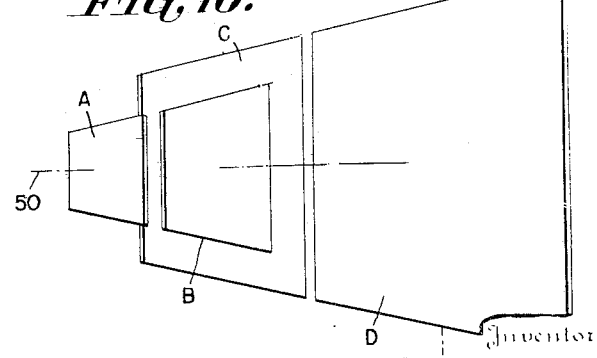

The system of Fig. 9 accomplishes the purposes of the system of Fig. 2 by employing four instead of two reflecting surfaces. Fig. 10 is a view of the same optical system, rotated 90 degrees from the view of Fig. 9.

The mirrors A and B may be replaced if desired by a totally reflecting 90 degree prism of suitable dimensions, the prism being adapted to be rotated about axis 50 in a manner similar to that heretofore described, and having its hypothenuse-face normally lying in a plane perpendicular to the lens axis and its other faces occupying positions corresponding to those of mirrors A and B.

The invention described herein may be readily applied to a stereo-camera or stereo continuous strip camera having a pair of lenses, by providing a pair of mirrors for each lens, one mirror of each pair being adapted to be rotated simultaneously about an axis to provide for image stabilization as the object moves angularly with respect to the lenses in a first plane of movement, the other mirror of each pair being adapted to be rotated simultaneously in equal amounts about parallel axes, to provide image stabilization as the object moves angularly with respect to the lenses in a second plane of movement substantially perpendicular to the first plane. The manner in which the image stabilizing is accomplished will be readily understood by those skilled in the art, after understanding the operation of the stabilizing system herein described for use with a camera having a single lens. Suitable supporting structure for the mirrors, and operative connections to the aforedescribed gyroscopes, may be readily provided to effect movement of the mirrors.

Figure 12:
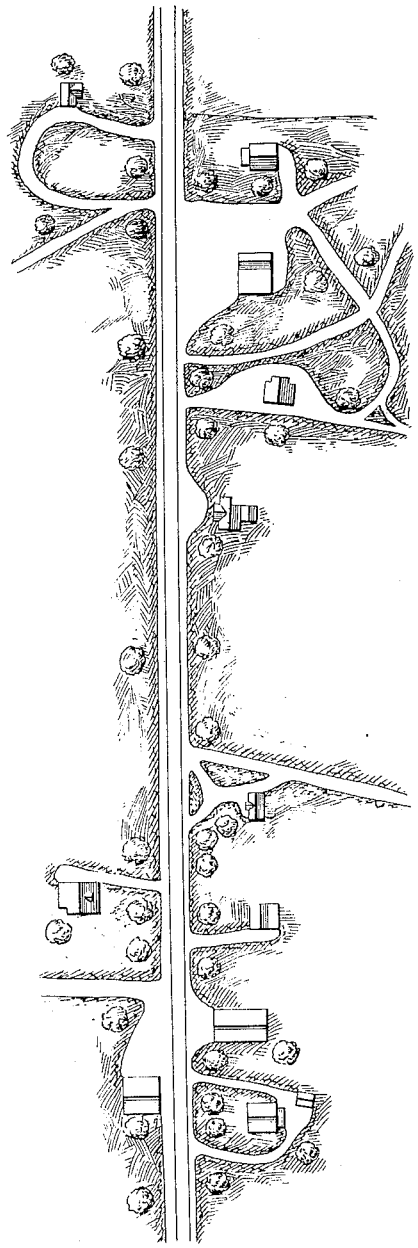
Fig. 12 is a view of a typical terrain as photographed with the image stabilizing system of Fig. 2.
Figure 13:
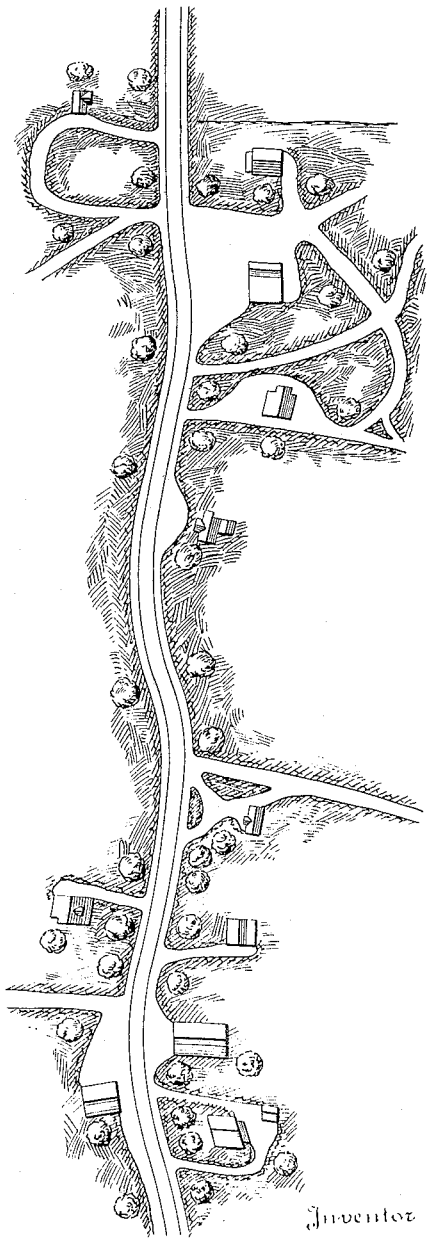
Fig. 13 is a view of the same terrain of Fig. 12 photographed without adequate image stabilizing equipment.

Figs. 12 and 13 illustrate the effectiveness of the subject invention, showing in adjacent views the same typical terrain, photographed by a continuous strip camera with and without the stabilizing device of Fig. 2 respectively.

It will be understood that suitable choice of dimensions and materials may be made to permit the various mirrors to be statically balanced.

Whereas the invention has been described herein with reference to two embodiments thereof, it will be understood by those skilled in the art to which the invention pertains, after understanding the invention, that various modifications of form or structure may be made without departing from the spirit or scope of the invention, and it is therefore intended to include in the appended claims all such modifications and equivalents, both mechanical and optical.

It will be apparent that, whereas the field of view of the camera is shown as directed toward the earth, it may be directed in any other desired direction, and the optical system and gyroscopes may be altered by a nominal amount of mechanical skill for such use.

Whereas the preferred embodiments of the device have been shown as using gyroscopes as the stabilizing means, it is of course understood that other suitable stabilizing means may be employed such, for example, as vertical seeking pendulums, gravity devices, or inertia masses, suitably connected operatively to the reflecting surfaces. Furthermore, whereas the device has been described with particular reference to use on aircraft, it will be understood that it may be used on any moving body.

This invention may be manufactured and used by or for the Government of the United States of America for governmental purposes without the payment of any royalties thereon or therefore.

What is claimed as new and desired to be secured by Letters Patent of the United States is:

1. In camera apparatus adapted for use on an angularly moving body and employing means for stabilizing the image of an object in the camera lens, a first reference system disposed on said body and having an element adapted to maintain a fixed position as the body moves with respect thereto in a first predetermined plane of angular movement, a second reference system disposed on said body and having an element adapted to maintain a fixed position as the body moves with respect thereto in a second predetermined plane of angular movement substantially perpendicular to said first plane, a first moving system including a first optical device disposed on said body and mounted for rotation about an axis perpendicular to the axis of said lens, an operative connection between said first optical device and the element of said first reference system, and said first optical system being adapted to be moved at one-half the rate of movement of said body and in a direction the same as the movement of the body in response to movement of the body with respect to the element of said first reference system in said first plane of movement, and a second moving system including a second optical device disposed on said body and mounted for rotation about an axis perpendicular to the axis of said first optical device, an operative connection between said second optical device and the element of said second reference system, and said second optical system being adapted to be moved at one-half the rate of movement of said body and in a direction opposite to the movement of the body in response to movement of the body with respect to the element of said second reference system in said second plane of angular movement, said first optical device facing toward the lens, said second optical device facing away from the lens and toward the first optical device whereby said optical devices act sequentially to reflect an image of the desired object to said lens, the movements of said optical devices in said first and second moving systems acting to stabilize the image in said lens when the camera moves angularly with respect to said object.

2. Image stabilizing apparatus mounted on a body subject to random angular movements and comprising a lens, said lens being mounted on said body, a plurality of surfaces cooperating optically to reflect the image of a desired object into said lens, means mounted on said body for moving in a direction the same as the movement of the body at least a first one of said plurality of surfaces at one-half the rate of movement of said lens to alter the angle of reflection therefrom to compensate for angular movement of said lens with respect to said object in a first plane of movement, and means mounted on said body for moving in a direction opposite to the movement of the body at least a second one of said plurality of surfaces at one-half the rate of movement of said lens to alter the angle of reflection therefrom to compensate for angular movement of said lens with respect to said object in a second plane of movement normal to said first plane, at least one of said first surfaces facing toward the lens and at least one of said second surfaces facing away from the lens and toward one of the first surfaces.

3. Photographic apparatus comprising a camera having a lens, and means for stabilizing the image in the lens as the camera undergoes random angular movements with respect to a desired object, said means comprising a first optical device facing toward said lens to reflect an image into the lens of said camera and adapted to be rotated in a direction the same as the movement of the camera thereby to change the angle of reflection therefrom to compensate for angular movements of said lens with respect to said object in a first plane of movement, a second optical device facing toward an object to be photographed and away from the lens to reflect an image of the object into said first optical device and adapted to be rotated in a direction opposite to the movement of the camera thereby to change the angle of reflection therefrom to compensate for angular movements of said lens with respect to said object in a second plane of movement, first and second gyroscopes disposed in predetermined stabilizing positions with respect to said camera, and first and second individual operative connections between said gyroscopes and said optical devices respectively for rotating said optical devices at one-half the rate of movement of said lens with respect to said objects.

4. Photographic apparatus for use on aircraft comprising a camera having a lens and adapted to be fixed to said aircraft to partake of angular movements thereof, the line of collimation of said camera being substantially vertical and extending in the direction beneath the aircraft when in normal flight, a first mirror faced away from said lens and a second mirror faced toward said lens and said first mirror, each of said mirrors being disposed beneath the lens of said camera, the reflecting surface of said first mirror being normally disposed so as to reflect an image of the ground beneath said aircraft into the second mirror and the second mirror being normally disposed to reflect the image received from the first mirror into the lens of said camera, each of said mirrors being adapted to rotate about an axis individual thereto, the axes of rotation of said mirrors being substantially perpendicular to each other and both transverse to the line of collimation, a first gyroscope and a second gyroscope having elements individual thereto adapted to maintain fixed positions as the aircraft moves with respect thereto in a pair of planes respectively as the craft pitches and rolls, said planes being substantially perpendicular to each other and each perpendicular to one of the axes of rotation respectively, an operative connection between said first gyroscope and said first mirror for rotating said first mirror about its axis when the aircraft pitches and through an angle of rotation substantially one-half the angle of pitch and in the same direction, and an operative connection between said second gyroscope and said second mirror for rotating said second mirror about its axis when the aircraft rolls, the angle of rotation of said second mirror being substantially one-half the angle of roll and in the opposite direction.

5. The combination of an optical instrument for use on a body subjected to random angular movements, and means to annul the effect of such angular movements on the field of view of the instrument, said means comprising a pair of movable mirrors, said mirrors being mounted upon shafts individual thereto, said shafts being mutually perpendicular and perpendicular to the optical axis of said instrument, said mirrors being disposed in spaced relation in the field of view and adapted to cooperate optically to reflect an image into said optical instrument, a pair of gyroscopes each having an extended gimbal shaft, a pair of crank arms each attached to one of said shafts, a pair of pins each attached to one of said crank arms, and a pair of lever arms each fixed to one of said mirror shafts and adapted to turn therewith, each of said lever arms, having a longitudinal slot therein adapted to engage one of said pins, whereby motion of said crank arms is transmitted to said mirror shafts respectively for individually moving said mirrors in predetermined manners to compensate for angular movements of said body, thereby to stabilize said field of view.

6. Apparatus for stabilizing an image in an angularly moving body comprising, a camera having a lens, said camera having a film angularly fixed with respect to said moving body, a first gyroscope fixed to said body and having an element arranged to maintain a fixed position as the body moves with respect thereto in a first plane of angular movement, a second gyroscope fixed to said body and having an element arranged to maintain a fixed position as the body moves with respect thereto in a second plane of angular movement, a first mirror mounted for movement in said first plane of angular movement and about an axis perpendicular to the axis of said lens, a second mirror mounted for movement in said second plane of angular movement and about an axis perpendicular to the axis of said lens and the axis of said first mirror, said first and second mirrors being mounted to respectively face toward the lens and away from the lens thereby to reflecting the image in sequential order, a first system of levers arranged to interconnect the element of said first gyroscope with said first mirror and to provide movement to the first mirror at one-half the rate of the movement of said moving body in said first plane of movement and in the same direction, and a second system of levers arranged to interconnect the element of said second gyroscope with said second mirror and to provide movement to the second mirror at one-half the rate of movement of said moving body in said second plane of movement and in the opposite direction.

7. Image stabilizing apparatus for a camera having a lens and mounted in an angularly moving body comprising, a first mirror having the reflecting surface thereof facing toward said lens, a second mirror having the reflecting surface thereof facing toward an object to be photographed and in a direction substantially opposite to said first mirror, said first and second mirrors being disposed in spaced relation in the field of view of said lens, said first mirror being tilted to receive an image of said object received by the second mirror and to reflect said image into the lens, means supporting said first mirror fo rotation about an axis perpendicular to the axis of said lens, means supporting said second mirror for rotation about an axis perpendicular to the axis of the lens and perpendicular to said axis of the first mirror, a first gyroscope having the principal axis thereof parallel to the axis of said first mirror, operative connections between said first gyroscope and said first mirror for rotating the mirror at one-half the angle and in the opposite direction to the pitching movements of the moving body, a second gyroscope having the principal axis thereof parallel to the axis of said second mirror, and operative connections between said second mirror and said second gyroscope for rotating the mirror at one-half the angle and in the same direction as the rolling movements of the moving body.

8. An image stabilizing attachment for a camera fixedly mounted in an aircraft for movement therewith and employed for terrestrial photography comprising, a rectangular frame member fixed to said camera, first and second reflector elements pivotally supported by said frame subjacent the lens of said camera, said first reflector element having the pivotal axis thereof transverse to the direction of flight of the aircraft, said second reflector element having the pivotal axis thereof parallel to the direction of flight of the aircraft, said first reflector element being tilted toward said second reflector element and facing toward said lens, said second reflector element being tilted toward said first reflector element and toward the ground and away from said lens whereby an image of the ground is reflected in sequential order from the second reflector element to the first reflector element and thence to the lens, a first gyroscope supported by said frame and having the operating axis thereof parallel to the pivotal axis of said first reflector element, first lever means having a ratio of one to two interconnecting said first gyroscope with said first reflector element and for rotating the first reflector element in a direction opposite to and concurrently with pitch movements of the aircraft, a second gyroscope supported by said frame and having the operating axis thereof parallel to the pivotal axis of the second reflector element, and second lever means having a ratio of one to two interconnecting said second gyroscope with said second reflector element and for rotating the second reflector element in a direction the same as and concurrently with roll movements of the aircraft.

9. A stabilizing attachment for an aerial survey camera mounted in an aircraft and comprising in combination, a supporting structure for said camera, said camera being mounted with the lens thereof pointing downwardly toward the earth, a frame secured to the underside of said camera and spaced about the lens thereof, first and second mirrors pivotally supported on said frame beneath said lens and covering the field of view thereof, each of said mirrors covering half of said field of view, said first mirror being faced away from the lens and toward the earth, said second mirror being faced toward the lens and away from the earth, both of said mirrors being tilted slightly with respect to true horizontal whereby an image of a portion of the earth is reflected from the first mirror to the second mirror and thence into the lens, said mirrors having mutually adjacent edges substantially intersecting the axis of said lens, the pivotal axes of said first and second mirrors being mutually perpendicular and at right angles to the axis of said lens, a first gyroscope mounted on said frame and having the operating shaft thereof parallel to the axis of said first mirror and to the line of flight of the aircraft, a second gyroscope mounted on said frame and having the operating shaft thereof parallel to the axis of said second mirror and at right angles to the line of flight of the aircraft, a first pair of levers operatively connecting the first gyroscope with the first mirror for rotating the first mirror in the same direction and at one-half the angular movement of the aircraft as the aircraft rolls, and a second pair of levers operatively connecting the second gyroscope with the second mirror for rotating the second mirror in the opposite direction and at one-half the angular movement of the aircraft as the aircraft pitches.

10. Apparatus for providing stabilization of the vertical line of sight of a camera lens fixedly mounted for movement with an aircraft in flight comprising a housing, a pair of oppositely disposed mirrors pivotally mounted in said housing and positioned immediately adjacent said vertical line of sight, one of said mirrors facing toward the lens and being positioned at one side of said vertical line of sight, the other of said mirrors facing away from said lens and being positioned at the other side of said vertical line of sight, each of said mirrors covering half of the field of view of the camera, means including a first gyroscope operatively connected to said one of said mirrors for rotating said one of the mirrors at one-half the angle and in the opposite direction to the angular movement of said aircraft in pitch directions, a second gyroscope operatively connected to said other one of the mirrors for rotating said other mirror at one-half the angle and in the same direction of angular movement of said aircraft in roll directions, said mirrors being tilted toward each other whereby an image is transmitted sequentially from one mirror to the other mirror and thence into the camera lens in substantially the same line of light transmission.

11. The image stabilizing apparatus of claim 2, wherein said plurality of surfaces consists of four surfaces.

12. The image stabilizing apparatus of claim 11, wherein said body is a continuous-strip camera provided with means for controlling speed of film movement, and said lens is the camera lens.

13. The image stabilizing apparatus of claim 12, further characterized by the structural relationship wherein a first pair of surfaces and a second pair of surfaces are disposed in predetermined optical relationship to sequentially reflect a desired image into the lens of the camera.

14. The image stabilizing apparatus of claim 11, wherein the means for moving the first and second surfaces comprises first and second gyroscopes respectively.

References Cited in the file of this patent

UNITED STATES PATENTS

| | | |
|---|---|---|
| 1,000,607 | Kellner | Aug. 15, 1911 |
| 1,588,682 | Henderson | June 15, 1926 |
| 1,601,390 | Henderson | Sept. 28, 1926 |
| 1,628,777 | Henderson | May 17, 1927 |
| 1,688,559 | Sperry | Oct. 23, 1928 |
| 1,709,314 | Henderson | Apr. 16, 1929 |
| 1,880,960 | Keale | Oct. 4, 1932 |
| 2,464,195 | Burley et al. | Mar. 8, 1949 |

FOREIGN PATENTS

| | | |
|---|---|---|
| 749,767 | France | July 29, 1933 |